(12) United States Patent
Hayek

(10) Patent No.: US 11,937,338 B2
(45) Date of Patent: Mar. 19, 2024

(54) REUSING SUBSCRIBER IDENTITY MODULE INFORMATION FOR RADIO ACCESS TECHNOLOGY CONVERSION

(71) Applicant: The ADT Security Corporation, Boca Raton, FL (US)

(72) Inventor: Charbel Hayek, Boca Raton, FL (US)

(73) Assignee: The ADT Security Corporation, Boca Raton, FL (US)

(*) Notice: Subject to any disclaimer, the term of this patent is extended or adjusted under 35 U.S.C. 154(b) by 0 days.

(21) Appl. No.: 18/192,344

(22) Filed: Mar. 29, 2023

(65) Prior Publication Data

US 2023/0262445 A1 Aug. 17, 2023

Related U.S. Application Data

(63) Continuation of application No. 17/973,126, filed on Oct. 25, 2022, now Pat. No. 11,653,195.
(Continued)

(51) Int. Cl.
*H04W 48/16* (2009.01)
*H04W 8/18* (2009.01)
(Continued)

(52) U.S. Cl.
CPC ............ *H04W 8/183* (2013.01); *H04W 8/20* (2013.01)

(58) Field of Classification Search
None
See application file for complete search history.

(56) References Cited

U.S. PATENT DOCUMENTS

2016/0020802 A1 1/2016 Lee et al.
2016/0330608 A1 11/2016 Benn
(Continued)

FOREIGN PATENT DOCUMENTS

EP 3761687 A1 1/2021
WO 2019136044 A1 7/2019

OTHER PUBLICATIONS

International Search Report and Written Opinion dated Feb. 20, 2023 for International Patent Application PCT/US2022/047718 filed Oct. 25, 2022, consisting of 18-pages.

*Primary Examiner* — Gary Lafontant
(74) *Attorney, Agent, or Firm* — Christopher & Weisberg, P.A.

(57) ABSTRACT

Conversion node apparatuses, methods, and systems are disclosed. According to various embodiments, a conversion node is configured to communicate with a premises security system. The premises security system includes a subscriber identity module (SIM) associated with a first subscriber profile. The conversion node includes an embedded subscriber identity module (eSIM) associated with a second subscriber profile. The method includes provisioning a first communication link with the premises security system, receiving the first subscriber profile via the first communication link, modifying the second subscriber profile associated with in the eSIM based at least on the received first subscriber profile, provisioning a second communication link with a cellular network based on the modified second subscriber profile, and communicating, via the provisioned second communication link, data associated with the premises security system to the cellular network.

20 Claims, 9 Drawing Sheets

Related U.S. Application Data

(60) Provisional application No. 63/295,201, filed on Dec. 30, 2021.

(51) Int. Cl.
*H04W 8/20* (2009.01)
*H04W 36/14* (2009.01)
*H04W 48/18* (2009.01)

(56) References Cited

U.S. PATENT DOCUMENTS

| | | |
|---|---|---|
| 2021/0158688 A1 | 5/2021 | Lau et al. |
| 2022/0210722 A1* | 6/2022 | Saini .................... H04W 36/14 |

* cited by examiner

REUSING SUBSCRIBER IDENTITY MODULE INFORMATION FOR RADIO ACCESS TECHNOLOGY CONVERSION

CROSS-REFERENCE TO RELATED PATENT APPLICATION

This application is a continuation of and claims priority to U.S. Utility patent application Ser. No. 17/973,126, filed on Oct. 25, 2022, entitled REUSING SUBSCRIBER IDENTITY MODULE INFORMATION FOR RADIO ACCESS TECHNOLOGY CONVERSION, which claims priority to U.S. Provisional Patent Application Ser. No. 63/295,201, filed Dec. 30, 2021, entitled REUSING SUBSCRIBER IDENTITY MODULE (SIM) INFORMATION FOR RADIO ACCESS TECHNOLOGY (RAT) CONVERSION, the entirety of both of which are incorporated herein by reference.

TECHNICAL FIELD

The present disclosure relates to wireless communications, and in particular, to enabling legacy devices operating using a legacy radio access technology (RAT) to continue communicating with wireless communications networks supporting another RAT (e.g., a newer RAT).

BACKGROUND

Cellular network operators typically employ subscriber identity modules (SIMs) for subscriber data that allows a device using the subscriber data to access a network. SIMS are often provided on a "smart card," such as a universal integrated circuit card (UICC) inserted into the subscriber's wireless device, or embedded in other software and/or hardware in the wireless device as an embedded SIM (eSIM). Information from the SIM is used to perform an Authentication and Key Agreement (AKA) procedure. This AKA procedure verifies and decrypts the relevant subscriber provisioning data and programs, which ensure a secure initialization procedure.

Cellular network operators are expected to end support for legacy, i.e., existing but not necessarily current generation, networks as newer radio access technologies (RATs) become implemented. However, millions of cellular wireless-capable devices, such as premises security devices, are currently deployed and are configured to operate on such legacy cellular telecommunications networks using legacy RATs (i.e., a first RAT). For example, premises security devices of a particular model may be configured only to communicate over 3G telecommunications networks, and may lack the hardware and/or software necessary for communicating over a second RAT (e.g., other RATs that may be modern/newer/contemporary/etc. RATs, such as 4G Long-Term Evolution (LTE), 5G New Radio (NR), etc.). Such legacy wireless devices may, for instance, include SIMs which are only configured to operate with the first RAT such as a legacy, e.g., 3G, RAT and are not configured to operate with a second RAT such as the newer RAT or another RAT. As a result, devices which are configured to operate using a first RAT (e.g. the legacy RAT) may require replacement or modification when the legacy network supporting such legacy RAT is shut down. Existing solutions for modifying or replacing such legacy devices to connect with a newer RAT, however, are cost prohibitive and pose an enormous logistical challenge for service providers and for customers, including the complexity of changing subscriber accounts and replacing/modifying SIMs associated with such legacy devices.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
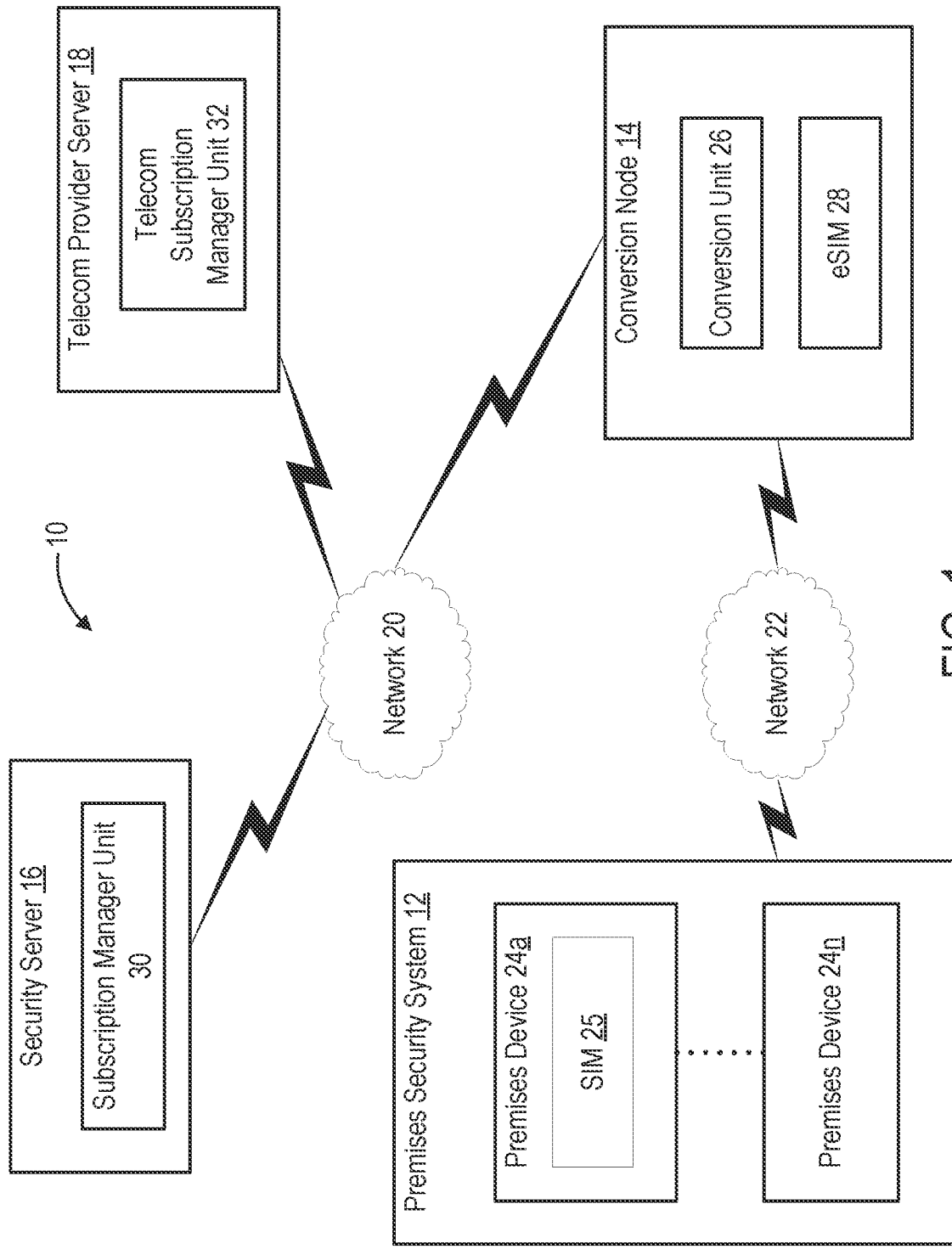
FIG. 1 is a schematic diagram of various devices and components according to some embodiments of the present disclosure.

Before describing in detail exemplary embodiments, it is noted that the embodiments may reside in combinations of apparatus components and processing steps related to conversion of communications from a first RAT (e.g., legacy RAT or first RAT communication link) to a second RAT for transmission over a second RAT network (e.g., using a second RAT communication link). Accordingly, components may be represented where appropriate by conventional symbols in the drawings, so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including" "has" and/or "having" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "node" used herein can be any kind of network node comprised in a radio network which may further comprise any of base station (BS), radio base station, base transceiver station (BTS), router, etc.

As used herein, the terms "SIM," "SIM card," "embedded SIM card," and "subscriber identity module" may refer to a memory that may be an integrated circuit, such as an UICC or embedded into a removable card, and that may store an International Mobile Subscriber Identity (IMSI), any related key(s), and/or other information configured to identify and/or authenticate a wireless device on a network and/or enable a communication service with the network. SIMs include, but are not limited to, the Universal Subscriber Identity Module (USIM) provided for in the LTE 3GPP standard, the Removable User Identity Module (R-UI) provided for in the 3GPP2 standard, and/or a Universal Integrated Circuit Card (UICC). The terms "embedded UICC" and "eUICC" may refer to a non-removable UICC. The term "eSIM" may refer to a non-removable SIM that is embedded in hardware and/or software in the wireless device.

In one or more embodiments, the term "cellular network" may refer to any network such as a network configurable to support wireless communication (and/or wired communication) and/or one or more RATs. The cellular network may be upgradable from a first RAT to a second RAT and/or to any other type of RAT or technology. In one example, a cellular network such as a first cellular network may support the first RAT and not the second RAT. In another example, a cellular network (e.g., a second cellular network) is upgraded to a second RAT, e.g., stops supporting features corresponding to the first RAT.

In some embodiments, the term "provisioning" (and/or "to provision") may refer to readying a device or node for communication with one or more other devices or nodes such as via one or more communication links and/or one or more RATs. In one or more embodiments, provisioning may include configuring, establishing, maintaining, and/or terminating the one or more communication links to communicate with one or more devices or nodes. Readying the device or node may include readying a card such as a SIM for the communication such as via the one or more communication links and/or one or more RATs. Readying the SIM may include configuring the SIM, device, and/or node to store, modify, and/or share information usable to establish, maintain, and/or terminate the communication, such as a subscriber profile and/or information associated with the subscriber profile.

Further, provisioning may include sharing the subscriber profile, information in the subscriber profile, and/or additional information for the device or node with another device or node, such as a security server, a telecom provider server, a subscription manager entity, etc., e.g., to authorize establishing, maintaining, and/or terminating the communication via one or more communication links and/or one or more RATs. The information shared with a security server, telecom provider server, and/or subscription manager entity may include information, such as a device identifier, that can be used to determine that a device and/or node is authorized for service with the service provider of the security server, telecom provider server, and/or subscription manager entity. For instance, a media access control (MAC) address for a device can be provided to a security server to confirm that the device is enrolled in a premises monitoring service provided by the entity that operates the security server. Further, provisioning may include using information of first subscriber profile (e.g., including device information such as radio information) in a first SIM associated with a first RAT to modify a second subscriber profile in a second SIM associated with a second RAT and/or to establish, maintain, and/or terminate communication using a cellular network that supports the second RAT based on the modified second subscriber profile in the second SIM.

In one nonlimiting example, a device (e.g., premises device) associated with the first SIM is not configured to (e.g., not provisioned to) communicate using the second RAT but may communicate with the cellular network that supports the second RAT (e.g., does not support the first RAT) via a node (e.g., a conversion node) comprising the second SIM and/or a modified second subscriber profile. In other words, although a telecom provider may no longer support the first RAT, the device associated with the first RAT may (e.g. be indirectly provisioned to) communicate with the cellular network that supports the second RAT, e.g., in a manner that is transparent to the device associated with the first RAT, the telecom provider, subscription manager, and/or cellular network.

In some embodiments, the premises security device herein can be any type of wireless device capable of communicating with a node of the network or another wireless device over radio signals, and may include a security alarm panel, camera, sensors, etc.

Note that although terminology from one particular wireless system or RAT, such as, for example, 3GPP LTE, New Radio (NR), 4G, 5G, etc., may be used in this disclosure, this should not be seen as limiting the scope of the disclosure to only the aforementioned system. Other wireless systems and RATs may also benefit from exploiting the ideas covered within this disclosure.

Note further, that functions described herein as being performed by a premises security device or a conversion node may be distributed over a plurality of premises security devices and/or conversion nodes. In other words, it is contemplated that the functions of the conversion node and premises security device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The apparatus, method, and system described herein perform conversion of communications for a legacy device from a first RAT to a second RAT and linking of the user's legacy SIM with the modern network SIM.

In particular, as described above, cellular network operators are expected to end support for legacy networks as newer radio access technologies, RATs, become implemented. For example, premises security devices manufactured by a particular entity may be configured only to communicate over 3G telecommunications networks, and may lack compatibility with modern, newer, and/or contemporary RATs, such as 4G LTE, 5G, etc. As a result, devices which are configured to operate using a first RAT (e.g., a legacy RAT) will require replacement when the legacy network supporting such first RAT is shut down. However, replacing or upgrading millions of such legacy devices may be cost prohibitive and may also pose an enormous logistical challenge. Rather than replacing or upgrading each one of such legacy devices, a conversion node as described herein may be used to provide a bridge between the legacy devices and networks using a second RAT (e.g., a newer RAT).

Transmitting or receiving via a public cellular network, such as a 4G LTE network, however, may require a SIM for enabling access to the network. To connect to the network, the conversion node may therefore use a SIM card or eSIM configured for connecting to the cellular network. However, the addition of such a SIM in the conversion node may require an additional subscriber account with the cellular network operator and/or an additional account with the security service provider. To avoid this need for additional accounts or subscriptions, one or more embodiments herein provide a conversion node which re-uses information from the SIM card and/or subscription of the legacy device, along with the eSIM in the conversion node, to connect with the cellular network using the modern RAT (i.e., a RAT other than a first RAT (e.g., legacy RAT)). The conversion node can then be sent as a plug and play device to a customer premises and provide conversion from a first RAT such as a legacy RAT (e.g., 3G) to a second RAT such as a newer RAT (e.g., 4G LTE, 5G New Radio (NR), etc.) with minimum effort or configuration by the customer. For example, the 4G LTE chipset in the conversion node, once powered up the first time at the customer premises, may initiate a "swap" of the legacy device's legacy radio access account (e.g., a legacy 3G radio access account) to a modern radio access account (e.g., a 4G LTE radio access account) seamlessly (e.g., without having to create a new account with the security service provider and/or telecom provider).

For example, when such a conversion node is powered up for the first time, the 4G LTE cellular network detects, decodes, and/or decrypts the SIM information in the legacy device, authenticates the SIM, and communicates cellular radio activation and administering tools. The conversion node may seamlessly swap the account of the legacy 3G device to the 4G conversion node, without having to create or manage a new LTE radio account, by reusing the SIM information in the legacy device, which includes adding and/or combining information of the legacy device SIM information to enable communication with a second RAT (e.g., newer RAT), and storing and/or reproducing the updated legacy device SIM information on another SIM, such as on the eSIM of the conversion node.

Referring now to the drawing figures, in which like elements are referred to by like reference numerals, there is shown in FIG. 1 is a schematic diagram of a communication system 10. System 10 may include a premises security system 12, conversion node 14, security server 16, and telecom provider server 18. Premises security system 12 and conversion node 14 may be located at a premises such as a subscriber's house, vehicle, or office building. Security server 16 may be a remote server, such as a cloud computing server, or may be co-located with premises security system 12 and/or with telecom provider server 18. In one or more embodiments, premises security system 12, conversion node 14, security server 16, and telecom provider server 18 may be configured to communicate with each other via one or more communication links and/or protocols and/or determine whether to grant provisioning of a node such as a conversion node and/or SIM to perform communication, via a communication link and/or protocol, of data which may be associated with a premises security system. Further, telecom provider server 18 may be configured to transmit information indicating that communication via the communication link has been authorized, e.g., to trigger conversion node 14 to perform the communication via the communication link.

Further, system 10 may include network 20, which may be configured to provide direct/indirect communication, e.g., wired and/or wireless communication, between any two or more components of system 10, e.g., premises security system 12, conversion node 14, security server 16, and/or telecom provider server 18. Although network 20 is shown as an intermediate network between components/devices of system 10, any component or device may communicate directly with any other component or device of system 10. For example, network 20 may be an internet protocol (IP) network that may be established as a wide area network (WAN) and/or local area network (LAN), among other IP-based networks, and/or network 20 may be a cellular network employing a RAT (e.g., a RAT that is newer than a legacy RAT, a RAT that supports features not supported by a legacy RAT, etc.).

Further, system 10 may include network 22, which may be configured to provide direct or indirect communication, e.g., wired and/or wireless communication, between any two or more components of system 10, e.g., premises security system 12, conversion node 14, security server 16, and/or telecom provider server 18. Although network 22 is shown as an intermediate network between components/devices of system 10, any component or device may communicate directly with any other component or device of system 10. For example, network 22 may be a cellular network employing a first RAT (e.g., legacy RAT) where conversion node 14 acts like a base station providing a coverage area for a cell. In some embodiments, network 22 is provided by a picocell, microcell, femtocell, or similar small cell with limited geographic coverage. That is, in some embodiments, conversion node 14 may be placed near one or more components of the premises security system 12 where the conversion node 14 may operate as a microcell, femtocell, picocell, etc., and may appear to devices of the premises security system 12 as the only legacy RAT cell site (i.e., the only site operating the first RAT) within range of the premises security system 12. The conversion node 14 may receive the legacy radio messages using the first RAT (e.g., legacy RAT) and may re-transmit the legacy radio messages or data associated with the legacy radio messages. In a nonlimiting example, the conversion node 14 may communicate (e.g., receive the legacy radio messages, re-transmit the legacy radio messages or data) via a RAT, such as 4G LTE or 5G or any RAT other than the legacy RAT and/or via a broadband connection (e.g., WiFi, Ethernet, etc.) through the RAT. In some embodiments, network 22 refers to a first cellular network, and network 20 refers to a second cellular network.

In some embodiments, conversion node 14 may be configured to communicate with premises security system 12, security server 16, telecom provider server 18, and/or any other device or subcomponent of system 10, via network 20. In some embodiments, conversion node 14 may be configured to communicate with premises security system 12 and/or any other device or subcomponent of system 10 via network 22.

Premises security system 12 may include one or more premises devices 24a-24n (collectively, premises devices 24). One or more premises devices 24 may include a SIM 25, or there may be one SIM 25 shared among multiple premises devices 24.

SIM 25 may be implemented by any device, either standalone or part of premises device 24a or premises security system 12, and is configurable for securely storing at least one subscriber profile associated with a cellular network. For example, SIM 25 may store subscriber profile information for communicating with network 22 or other networks operating using a first RAT (e.g., legacy RAT). SIM 25 may be a universal integrated circuit card (UICC), full SIM, mini SIM, micro SIM, embedded SIM, eSIM, eUICC, and/or any other device and/or software executed on processing circuitry configured for identifying a subscriber's wireless device for connecting to network 22. SIM 25 may include one or more SIM profiles, each of which may include user account information, an international mobile subscriber identity (IMSI), home identifiers, a System Identification Number (SID), a Network Identification Number (NID), a Home public land mobile network (PLMN) list, an Integrated Circuit Card Identity (ICCID), authentication keys, access point names (APNs), plan information, user profile information, subscriber profile information (e.g., information regarding a subscriber profile associated with a user and/or with at least a component of communication system 10 such as premises device 24/premises security system 12, etc.), and/or any other data for facilitating subscriber authentication on a cellular network. In addition to storing account information associated with one or more public cellular networks, SIM 25 may also include account information (e.g., device identification information, user profiles, subscription plan information, etc.) associated with a premises security monitoring service, smart home automation service, etc.

Premises devices 24 may be configured to monitor doors, driveway gates, windows, and other openings, or to control lights, appliances, HVAC systems (e.g., temperature, cooling, heating, exhaust fans, etc.), access control, door locks, lawn sprinklers, etc. For example, one or more premises devices 24 may be used to sense motion and other alarm conditions, such as glass breaking, fire, smoke, temperature, chemical compositions, water, carbon monoxide, or other hazardous conditions. Premises device 24 may include video cameras that may be used to detect motion and/or capture video of events, and or other sensor that are not particularly limited and may also include any number of health, safety, and lifestyle devices. Examples of lifestyle devices include medical condition monitors and personal emergency response systems, thermostats, appliance modules, key fobs, keypads, and touch screens, a gateway router, etc. The term "premises" as used herein is not limited to a home and may refer to a boat, office suite, industrial building, or any other indoor or outdoor area where control of premises devices 24 is desired. It should be understood that not all of such premises devices 24 may be installed within a given system.

Conversion node 14 may use a variety of wireless communication protocols. For example, conversion node 14 may be part of or may include a home automation device, and may use wireless and/or wired protocols developed for home automation, such as X10, Z-wave, and ZigBee, while others use other wireless protocols such as Wi-Fi and BLUETOOTH, as well as mobile/cellular wireless communication protocols, such as 3G, UMTS, CDMA2000, 4G, 4G LTE, 5G NR, etc.

Conversion node 14 may include conversion unit 26 and eSIM 28. Conversion unit 26 may be implemented by any device, either standalone or part of conversion node 14, configurable for receiving a subscriber profile from premises security system 12/premises devices 24 and modifying eSIM 28 based on the received subscriber profile, and also configurable for receiving data via a first RAT and causing transmission of the data via a second RAT using the modified eSIM 28.

eSIM 28 may be implemented by any device, either standalone or part of conversion node 14, configurable for securely storing a subscriber profile associated with a cellular network and/or communication system 10. Prior to the conversion node 14 communicating with premises security system 12, eSIM 28 may include subscription information for initiating a connection with the second RAT (e.g., newer RAT). After communicating with premises security system 12 and the conversion node 14 obtains information from SIM 25 of premises security system 12 and/or premises devices 24, eSIM 28 is modified to include some or all of the information stored in SIM 25, such that the modified eSIM 28 includes both information from SIM 25 and pre-stored information included with the eSIM 28, the combination of which enables conversion node 14 to connect to/access the second RAT (e.g., newer RAT). In various embodiments, the conversion node 14 can use data from a premises device 24 to determine whether the premises device 24 is enrolled in service with the service provider associated with the security server 16. For example, the conversion node 14 can obtain the MAC address of a premises device 24, transmit the MAC address to the security server 16, and receive from the security server 16 a confirmation based on the MAC address that the premises device 24 is enrolled in a security service and is authorized to communicate with the security server 16.

eSIM 28 may be a SIM that is embedded as non-removable hardware and/or software in the conversion node 14 and configurable within the conversion node 14 to provide SIM functions without the need to use a removable physical SIM. In some embodiments, eSIM 28 may be a universal integrated circuit card (UICC), eUICC, and/or any other device and/or software executed on processing circuitry configured for identifying a subscriber's wireless device for connecting to a cellular network. eSIM 28 may include one or more SIM profiles, each of which may include user account information, IMSI, home identifiers, SID, NID, PLMN, ICCID, an authentication key, and/or any other data for facilitating subscriber authentication on a cellular network such as a subscriber profile (e.g., a subscriber profile associated with a user and/or with at least a component of communication system 10 such as premises device 24 or premises security system 12, etc.). The subscriber profile may be configurable by conversion node 14 and/or conversion unit 26 such as based on a subscriber profile and/or information associated with SIM 25 and/or premises device 24 and/or premises security system 12 and/or networks 20, 22. The subscriber profile of eSIM 28 may also be based on information associated with security server 16 and/or telecom provider server 18.

Security server 16 may use a variety of wired and/or wireless communications protocols. Security server 16 may be configured to communicate data over a network, such as network 20, to communicate with telecom provider server 18, conversion node 14, and/or premises devices 24.

Security server 16 may include subscription manager unit 30. Subscription manager unit 30 may be implemented by any device, either standalone or part of security server 16, configurable for authenticating subscriber profiles associated with the premises security system 12, for example, by matching information in the profile with associated information in a user account database, and determining based on the information in the database whether the subscription is active, what services are associated with the subscription, etc. The database may include one or more entries, each entry including at least a user account, a list of any premises device(s) associated with the user account, and a list of services available to the user account/premises device(s).

Subscription manager unit 30 may authenticate subscription information stored in SIM 25 and/or eSIM 28. Alternatively, or additionally, subscription manager unit 30 may authenticate subscription information and/or device information stored in memory 52 of premises device 24a, memory 40 of conversion node 14, and/or in a database stored in and/or accessible from security server 16. For example, premises device 24a may include a unique device identifier number stored in memory 52 and/or SIM 25. Premises device 24a/premises security system 12 may transmit the unique device identifier, along with other authentication/identification/subscription information (e.g., authentication keys), to conversion node 14 via network 22, either as part of the SIM swap procedure, or subsequent or prior to the swap procedure. Conversion node 14 may store the information in eSIM 28, and/or may store it in memory 40. Conversion node 14 may transmit the unique device identifier associated with premises device 24a to security server 16 via network 20, along with any other authentication, identification, and/or subscription information. Subscription manager unit 30 matches the received unique device identifier and/or other received information with one or more entries in the account database, and determines, based on the entry or entries, which services to provide premises security system 12 and/or premises device 24a.

Security server 16 functionality may be performed by a single server or distributed among multiple servers or computing devices. For example, security server 16 functionality, as described herein, may be performed by an on-site or off-site server. Alternatively, security server 16 functionality may be performed by several computing devices that may be located in the same general location or different locations, e.g., cloud computing. In other words, each computing device may perform one or more particular sub-processes of security server 16 and may communicate with each other via network 20 and/or network 22.

Telecom provider server 18 may use a variety of wired and/or wireless communications protocols. Telecom provider server 18 may be configured to communicate data over a network using a second RAT (e.g., modern RAT), such as network 20, to communicate with conversion node 14.

Telecom provider server 18 may include telecom subscription manager unit 32. Telecom subscription manager unit 32 may be implemented by any device, either standalone or part of telecom provider server 18, configurable for authenticating subscriber profiles associated with the telecom provider, for example, by matching information in the profile with associated information in a user account database, and determining based on the information in the database whether the subscription is active, what services are associated with the subscription, etc. That is, telecom subscription management unit 32 may authenticate subscriber profile information associated with access and using network 20.

Telecom provider server 18 functionality may be performed by a single server or distributed among multiple servers or computing devices. For example, telecom provider server 18 functionality, as described herein, may be performed by an on-site or off-site server. Alternatively, telecom provider server 18 functionality may be performed by several computing devices that may be located in the same general location or different locations, e.g., cloud computing. In other words, each computing device may perform one or more particular sub-processes of telecom provider server 18 and may communicate with each other via network 20.

Figure 2:
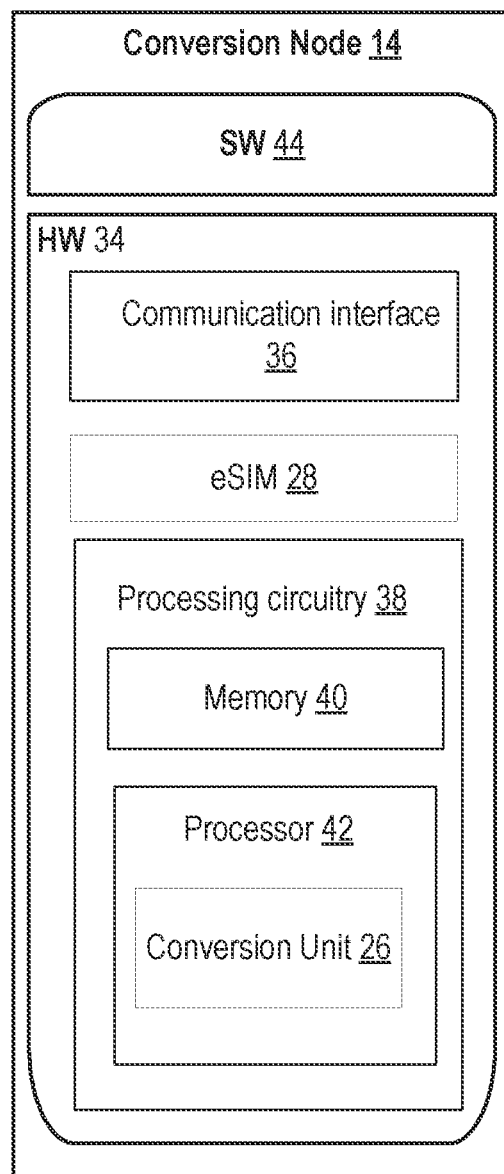
FIG. 2 is a block diagram of an example conversion node according to some embodiments of the present disclosure.

Referring now to FIG. 2, conversion node 14 may include hardware 34, including eSIM 28, communication interface 36, and processing circuitry 38. The processing circuitry 38 may include a memory 40 and a processor 42. In addition to, or instead of a processor, such as a central processing unit, and memory, the processing circuitry 38 may comprise integrated circuitry for processing and/or control, e.g., one or more processors and/or processor cores and/or Field Programmable Gate Arrays (FPGAs) and/or Application Specific Integrated Circuits (ASICs) adapted to execute instructions. The processor 42 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Communication interface 36 may comprise and/or be configured to support communication using a femtocell such as a 3G femtocell, an internal interface, a RAT chipset section such as an LTE chipset section configured to support one or more LTE functions.

Conversion node 14 may further include software 44 stored internally in, for example, memory 40 or stored in external memory (e.g., database, storage array, network storage device, etc.) accessible by conversion node 14 via an external connection. The software 44 may be executable by the processing circuitry 38. The processing circuitry 38 may be configured to control any of the methods and/or processes described herein and/or to cause such methods, and/or processes to be performed, e.g., by conversion node 14. Processor 42 corresponds to one or more processors 42 for performing conversion node 14 functions described herein. The memory 40 is configured to store data, programmatic software code and/or other information described herein. In some embodiments, the software 44 may include instructions that, when executed by the processor 42 and/or processing circuitry 38, causes the processor 42 and/or processing circuitry 38 to perform the processes described herein with respect to conversion node 14. For example, processing circuitry 38 of the conversion node 14 may include conversion unit 26 configured to perform one or more conversion node 14 functions as described herein such as serving as a wireless base station for premises devices 24, modifying eSIM information, converting communications from a first RAT to a second RAT, and communicating wirelessly with a telecom provider's cellular network 20, as described herein.

eSIM 28 may be a subcomponent or submodule of hardware 34 and/or software 44 and/or may be stored internally in, for example, memory 40, or may be stored in external memory (e.g., database, storage array, network storage device, etc.) accessible by conversion node 14 via an external connection.

Communication interface 36 may include at least a radio interface configured to set up and maintain a wireless connection with network 20 and/or network 22. For example, communication interface 36 may include a first radio interface configured to set up and maintain a wireless connection with network 22 using a first RAT (e.g., legacy RAT such as 3G) and/or a second radio interface configured to set up and maintain a wireless connection with network 20 using a second RAT (e.g., newer RAT such as LTE). The radio interface may be formed as, or may include, for example, one or more radio frequency, RF transmitters, one or more RF receivers, and/or one or more RF transceivers. Communication interface 36 may include a wired communication interface, such as Ethernet, configured to set up and maintain a wired connection with network 20 and/or network 22.

Figure 3:
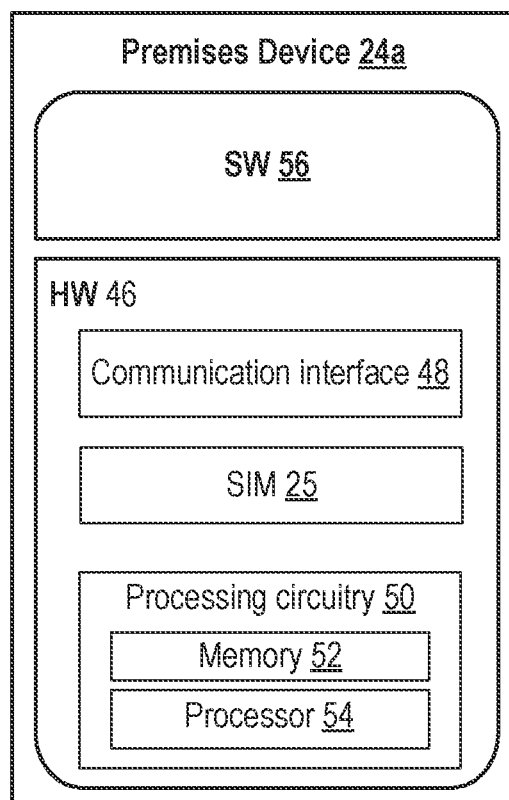
FIG. 3 is a block diagram of an example premises device according to some embodiments of the present disclosure.

Referring now to FIG. 3, the communication system 10 further includes premises devices 24, such as premises device 24a, which may be included as part of premises security system 12 (shown in FIG. 1). For example, premise device 24a may have hardware 46 that may include communication interface 48, which may include a radio interface, configured to set up and maintain a wireless connection with network 22. The radio interface may be formed as or may include, for example, one or more RF transmitters, one or more RF receivers, and/or one or more RF transceivers. Communication interface 48 may include a radio interface configured to set up and maintain a wireless connection with network 22 using a first RAT (e.g., legacy RAT), although communication interface 48 need not be so limited. Communication interface 48 may use a variety of short range wireless communication protocols. For example, premises device 24a may be part of or may include a home automation device, and the communication interface 48 may be configured to use wireless and/or wired protocols developed for home automation, like X10, Z-wave and ZigBee, while others use more general wireless protocols such as Wi-Fi and BLUETOOTH. However, premises device 24a may be configured to communicate with security server 16 (e.g., remote monitoring center) via the legacy network using first RAT (e.g., legacy RAT). In some embodiments, communication interface 48 and/or premises device 24a and/or premises security system 12 may lack a radio interface for setting up and maintaining a wireless connection with a second RAT (e.g., newer RAT).

The hardware 46 of premises device 24a may further include processing circuitry 50. The processing circuitry 50 may include a memory 52 and a processor 54. In addition to, or instead of a processor, such as a central processing unit, and memory, the processing circuitry 50 may comprise integrated circuitry for processing and/or control, e.g., one or more processors and/or processor cores and/or Field Programmable Gate Arrays (FPGAs) and/or Application Specific Integrated Circuits (ASICs) adapted to execute instructions. The processor 54 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Memory 52 may include account information (e.g., device identification information, user profiles, subscription plan information, etc.) associated with a premises security monitoring service, smart home automation service, etc.

The hardware 46 of premises device 24a may further include SIM 25. SIM 25 may be a subcomponent or submodule of hardware 46, such as communication interface 48, and/or may be stored internally in, for example, memory 52, or may be stored in external memory (e.g., database, storage array, network storage device, etc.) accessible by premises device 24a via an external connection. SIM 25 may be in communication with communication interface 48, to enable communication interface 48 to communicate via a first RAT (e.g., legacy RAT).

Premises device 24a further includes software 56 stored internally in, for example, memory 52 or stored in external memory (e.g., database, storage array, network storage device, etc.) accessible by premises device 24a via an external connection. The software 56 may be executable by the processing circuitry 50. The processing circuitry 50 may be configured to control any of the methods and/or processes described herein and/or to cause such methods, and/or processes to be performed, e.g., by premises device 24a. Processor 54 corresponds to one or more processors 54 for performing premises device 24a functions described herein. The memory 52 is configured to store data, programmatic software code and/or other information described herein. In some embodiments, the software 56 may include instructions that, when executed by the processor 54 and/or processing circuitry 50, causes the processor 54 and/or processing circuitry 50 to perform the processes described herein with respect to premises device 24a.

Figure 4:
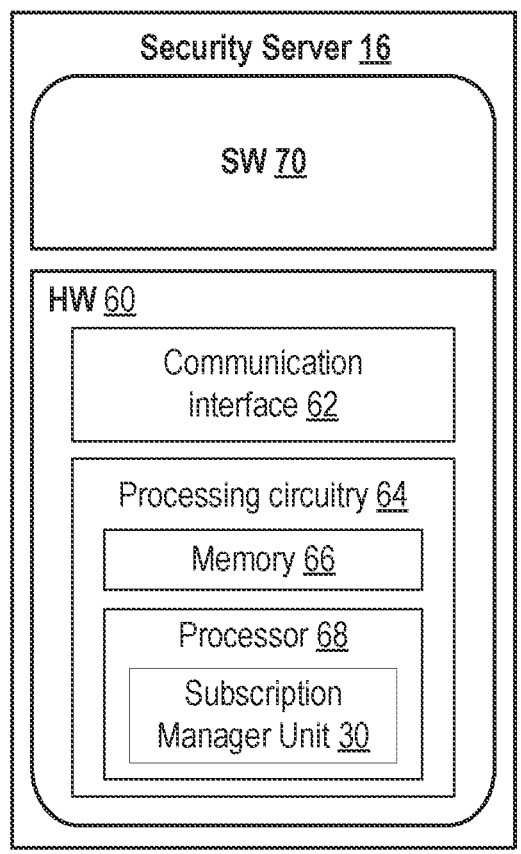
FIG. 4 is a block diagram of an example security server according to some embodiments of the present disclosure.

Referring now to FIG. 4, the communication system 10 further includes security server 16 already referred to. The security server 16 may have hardware 60 that may include communication interface 62, which may include a radio interface, configured to set up and maintain a wireless connection with network 20. The radio interface may be formed as or may include, for example, one or more RF transmitters, one or more RF receivers, and/or one or more RF transceivers. Communication interface 62 may include a radio interface configured to set up and maintain a wireless connection with network 20 using a second RAT (e.g., newer RAT). Communication interface 62 may include a wired communication interface, such as Ethernet, configured to set up and maintain a wired connection with network 20.

The hardware 60 of security server 16 may further include processing circuitry 64. The processing circuitry 64 may include a memory 66 and a processor 68. In addition to, or instead of a processor, such as a central processing unit, and memory, the processing circuitry 64 may comprise integrated circuitry for processing and/or control, e.g., one or more processors and/or processor cores and/or Field Programmable Gate Arrays (FPGAs) and/or Application Specific Integrated Circuits (ASICs) adapted to execute instructions. The processor 68 may be configured to access (e.g., write to and/or read from) the memory 66, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Security server 16 further includes software 70 stored internally in, for example, memory 66 or stored in external memory (e.g., database, storage array, network storage device, etc.) accessible by security server 16 via an external connection. The software 70 may be executable by the processing circuitry 64. The processing circuitry 64 may be configured to control any of the methods and/or processes described herein and/or to cause such methods, and/or processes to be performed, e.g., by security server 16. Processor 68 corresponds to one or more processors 68 for performing security server 16 functions described herein. The memory 66 is configured to store data, programmatic software code and/or other information described herein. In some embodiments, the software 70 may include instructions that, when executed by the processor 68 and/or processing circuitry 64, causes the processor 68 and/or processing circuitry 64 to perform the processes described herein with respect to security server 16. For example, the processing circuitry 64 may include subscription manager unit 30 configured to perform one or more security server functions as described herein such as with respect to authenticating a device's subscription information and/or user's account information stored in SIM 25, memory 52, eSIM 28, and/or memory 40, and communicated by the conversion node 14 via network 20 to the security server 16.

Figure 5:
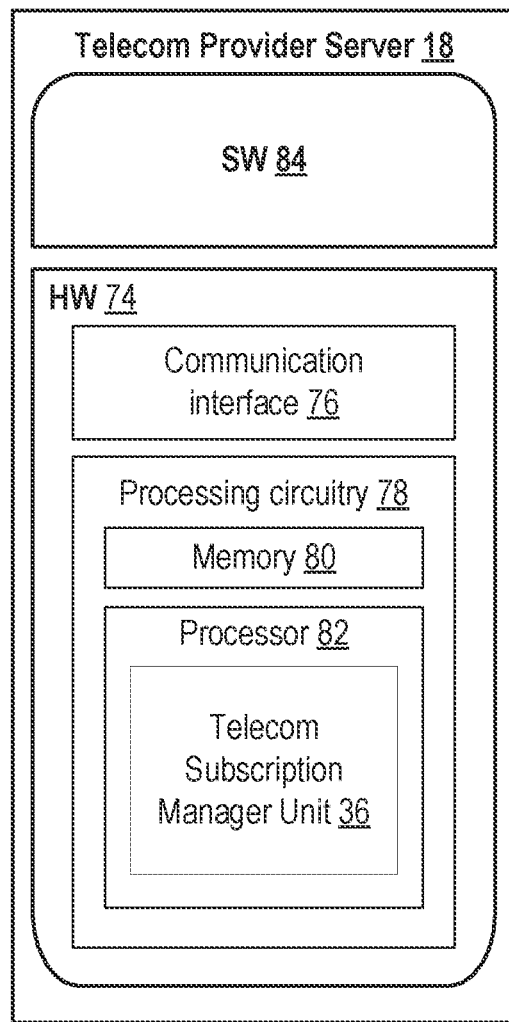
FIG. 5 is a block diagram of an example telecom provider server according to some embodiments of the present disclosure.

Referring now to FIG. 5, the communication system 10 further includes telecom provider server 18 already referred to. The telecom provider server 18 may have hardware 74 that may include communication interface 76, which may include a radio interface, configured to set up and maintain a wireless connection with network 20. The radio interface may be formed as or may include, for example, one or more RF transmitters, one or more RF receivers, and/or one or more RF transceivers. Communication interface 76 may include a radio interface configured to set up and maintain a wireless connection with network 20 using a RAT. The RAT may include a modem and/or newer RAT relative to a legacy rat, a RAT supporting features not supported by a legacy RAT such as 3G, a RAT such as LTE, LTE plus, 5G, etc. Communication interface 76 may include a wired communication interface, such as Ethernet, configured to set up and maintain a wired connection with network 20.

The hardware 74 of telecom provider server 18 may further include processing circuitry 78. The processing circuitry 78 may include a memory 80 and a processor 82. In addition to, or instead of a processor, such as a central processing unit, and memory, the processing circuitry 78 may comprise integrated circuitry for processing and/or control, e.g., one or more processors and/or processor cores and/or Field Programmable Gate Array (FPGAs) and/or Application Specific Integrated Circuits (ASICs) adapted to execute instructions. The processor 82 may be configured to access (e.g., write to and/or read from) the memory 80, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Telecom provider server 18 further includes software 84 stored internally in, for example, memory 80 or stored in external memory (e.g., database, storage array, network storage device, etc.) accessible by telecom provider server 18 via an external connection. The software 84 may be executable by the processing circuitry 78. The processing circuitry 78 may be configured to control any of the methods and/or processes described herein and/or to cause such methods, and/or processes to be performed, e.g., by telecom provider server 18. Processor 82 corresponds to one or more processors 82 for performing telecom provider server 18 functions described herein. The memory 80 is configured to store data, programmatic software code and/or other information described herein. In some embodiments, the software 84 may include instructions that, when executed by the processor 82 and/or processing circuitry 78, causes the processor 82 and/or processing circuitry 78 to perform the processes described herein with respect to telecom provider server 18. For example, the processing circuitry 78 may include telecom subscription manager unit 32 configured to perform one or more telecom provider server 18 functions as described herein such as with respect to authenticating a device's subscription information and/or user's account information associated with the telecom provider and stored in SIM 25 and/or eSIM 28 and communicated by the conversion node 14 via network 20 to the telecom provider server 18.

Although FIGS. 2-5 show various units as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
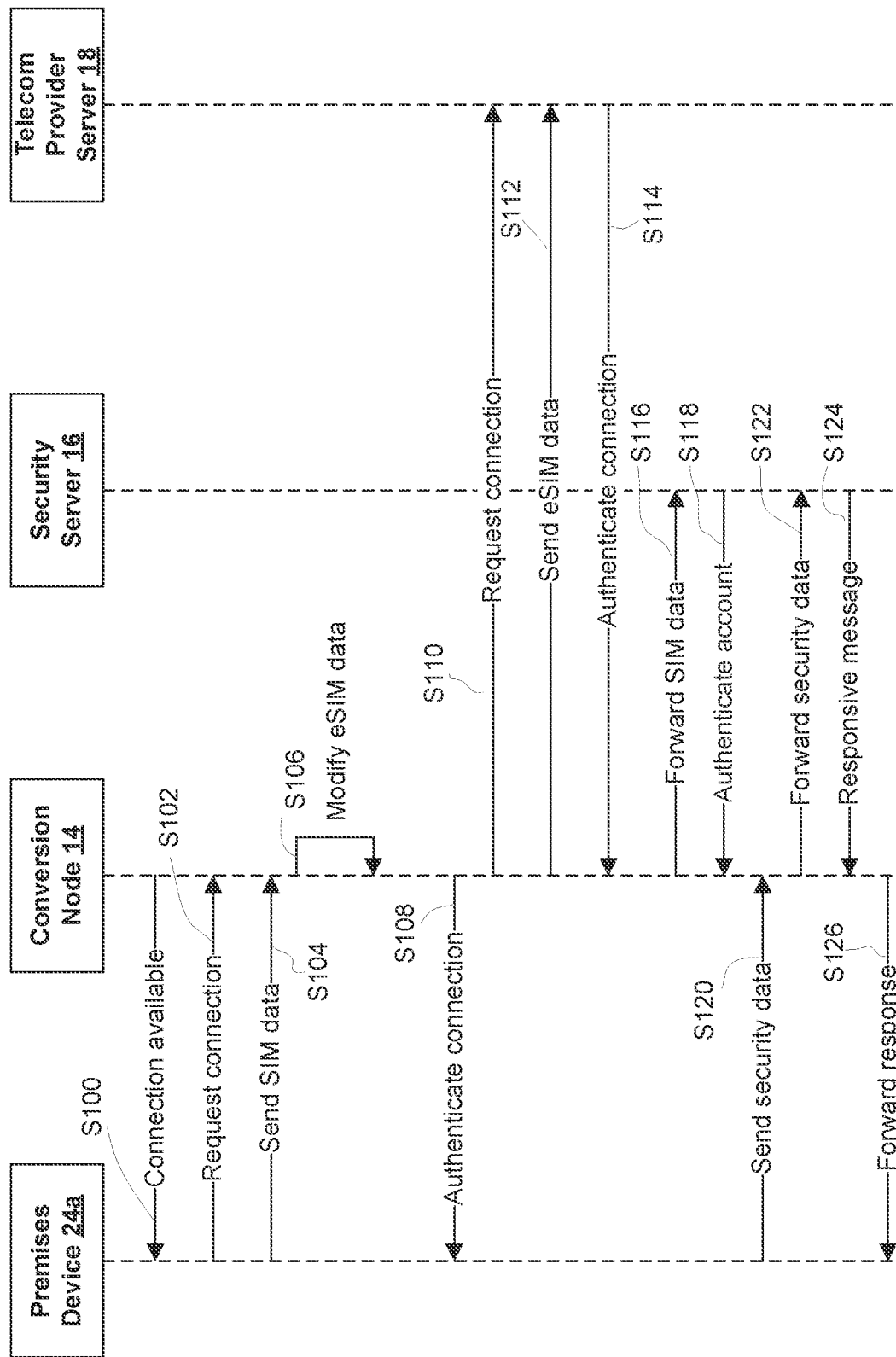
FIG. 6 is a signaling diagram of an example process according to some embodiments of the present disclosure.

FIG. 6 is a sequence diagram of an example process in a communication system 10 according to some embodiments of the invention. At S100, the conversion node 14 broadcasts that a connection is available. For example, the conversion node 14 may broadcast signals according to a first RAT (e.g., a legacy RAT) protocol that identifies the conversion node 14 as a first RAT (e.g., legacy) base station. Premises device 24a, which has not yet connected to conversion node 14, scans a portion of the wireless spectrum where it expects signals according to the first RAT (e.g., legacy RAT), and detects the broadcasted signals from the conversion node 14. Premises device 24a requests a first RAT (e.g., legacy RAT) connection (S102) with the conversion node 14 via network 22 (e.g., legacy network or coverage area of a cell provided by conversion node 14). In some embodiments, conversion node 14 may appear to premises device 24a to be a base station in accordance with the first RAT (e.g., legacy RAT).

As part of the request for a connection, or subsequent to the request (S104), premises device 24a sends data stored in the SIM 25, such as an encrypted subscriber profile (e.g., a first subscriber profile), to conversion node 14 via network 22. Conversion node 14 and/or conversion unit 26 translates, decrypts, and/or deciphers the SIM 25 data and modifies the eSIM 28 accordingly (S106). In some embodiments, conversion node 14 may have one or more stored decryption keys (e.g., stored in memory 40) for decrypting the SIM 25 data, thereby allowing the conversion node 14 to modify the eSIM 28 based at least on at least a portion of the decrypted SIM 25 data. In some embodiments, conversion node 14 may receive the decryption keys from telecom provider server 18 and/or from security server 16 (e.g., via network 20). In some embodiments, conversion node 14 may be pre-programmed with the decryption keys for decrypting the SIM 25 data, e.g., by the vendor prior to shipment to the customer. In some embodiments, conversion node 14 may perform an AKA procedure to interpret the SIM 25 data.

In some embodiments, conversion node 14 and/or conversion unit 26 may modify eSIM 28 (e.g., modify a second subscriber profile and/or include one or more parameters associated with premises device 24, premises security system 12, account information associated with the premises device 24 and/or premises security system 12, etc.) based on information contained in the SIM 25 data (and/or one or more parameters associated with premises device 24, premises security system 12, account information associated with the premises device 24 and/or premises security system 12, etc.), for example, by adding or replacing fields of a subscriber profile in the eSIM 28 based on data in similar and/or associated fields in the SIM 25 data, thereby generating a modified subscriber profile (e.g., modified second subscriber profile). Therefore, in one or more embodiments, conversion node 14 is able to generate a modified subscriber profile for use in access to a second RAT network such as a RAT network (e.g., 4G, 5G, etc.) based at least on a subscriber profile associated with access to a first RAT (e.g., legacy RAT) network, thereby providing a communication link from a legacy device to a modern RAT network. The second RAT may be considered newer than the first RAT, e.g., where the first RAT is a legacy RAT, and the second RAT is the newer RAT supporting one or more new features not supported by the first RAT.

Conversion node 14 confirms (e.g., authenticates) the connection (S108) with premises device 24a via network 22. Conversion node 14 requests a connection between the second RAT and telecom provider server 18 (S110) via network 20. As part of the request, or subsequent to the request, conversion node 14 sends eSIM 28 data to telecom provider server 18 (S112) via network 20. For example, conversion node 14 may send a modified subscriber profile stored in the eSIM 28 which has been modified as described herein based on the SIM 25 data. Telecom provider server 18 and/or telecom subscription manager unit 32 authenticates the connection based on the eSIM data (e.g., the modified subscriber profile in the eSIM 28 which has been modified by the SIM 25 data) and an account database at the telecom provider server 18 (S114), and provides conversion node 14 with the necessary authentication data and/or tokens to be able to send and receive data via network 20 (e.g., using the second RAT such as the newer RAT).

Conversion node 14 then sends (S116) subscription data (e.g., device identification data and/or a subscriber profile stored in eSIM 28, memory 40, and/or memory 52) associated with a service, such as a security monitoring service, to the security server 16 via network 20, as a request to authenticate the account, subscription of premises device 24a, and/or premises security system 12. Security server 16 and/or subscription manager unit 30 authenticates the account (e.g., security monitoring account) of the premises security system 12 and/or premises device 24a (S118) based on the received subscription data and an account database at the security server 16, as described herein.

At this point, the connections of system 10 have been initialized, and the premises device 24a and/or other devices of premises security system 12 may perform typical security and/or monitoring functions, such as sending security alerts to the security server 16. For example, premises device 24a may generate security data (e.g., security alerts, audio/video recordings, error messages, etc.) and transmit the security data to the conversion node 14 (S120) via network 22 using the first RAT (e.g., legacy RAT) such as via at least one first RAT packet (e.g., legacy RAT packet).

Conversion node 14 then forwards the security data to security server 16 (122) via network 20 such as by using at least one second RAT packet. Security server 16 responds to the received security data (S124) by sending a responsive message to conversion node 14 via network 20. In one or more embodiments, the response may include one or more of sending a confirmation of receipt, sending instructions to perform various security functions, etc. Conversion node 14 forwards the responsive message (S126) to premises device 24a via network 22, such as via at least one first RAT packet. In one or more embodiments, S124 and S126 may be omitted. For example, security server 16 may trigger an action (e.g., send an alert to first responders, etc.) without transmitting a response message to premises device 24a via conversion node 14.

Therefore, the need for an additional or new subscription/account (e.g., premises security system account and/or telecom provider account) is avoided by re-using SIM 25 in combination with eSIM 28 to connect with network 20 using the second RAT. This allows the conversion node 14 to be sent as a plug and play device to a customer premises and to provide conversion from a first RAT such as a legacy RAT (e.g., 3G) to a second RAT such as a newer RAT (e.g., 4G LTE, 5G New Radio (NR), etc.) with minimum effort or configuration by the customer. Because the eSIM 28 of conversion node 14 is provided to the customer premises, the cellular network operator does not need to provide a new SIM card for the legacy device, thereby avoiding the expense and logistical challenge of providing new SIM cards. Use of conversion node 14 also avoids the need for replacing and/or modifying the legacy devices (e.g., by replacing the internal hardware with newer components that are configured to communicate via a second RAT), which may be expensive, time-consuming, and labor-intensive. Further, re-using the information of SIM 25 also avoids the time needed and the expense of the manufacturer and/or vendor needing to load customer-specific information into each eSIM 28 of each conversion node 14 prior to shipping each conversion node 14 to the customer. Instead, each conversion node 14 may include a standard template subscriber profile stored in the eSIM 28, the template including some of the information necessary for connecting to the second RAT (e.g., newer RAT), such that, after shipment to the customer premises, the conversion node 14 communicates with the premises security system 12 to obtain the information obtained from SIM 25, combines that information with the template profile in the eSIM 28, and uses the combined profile to connect to the second RAT (e.g., newer RAT).

Figure 7:
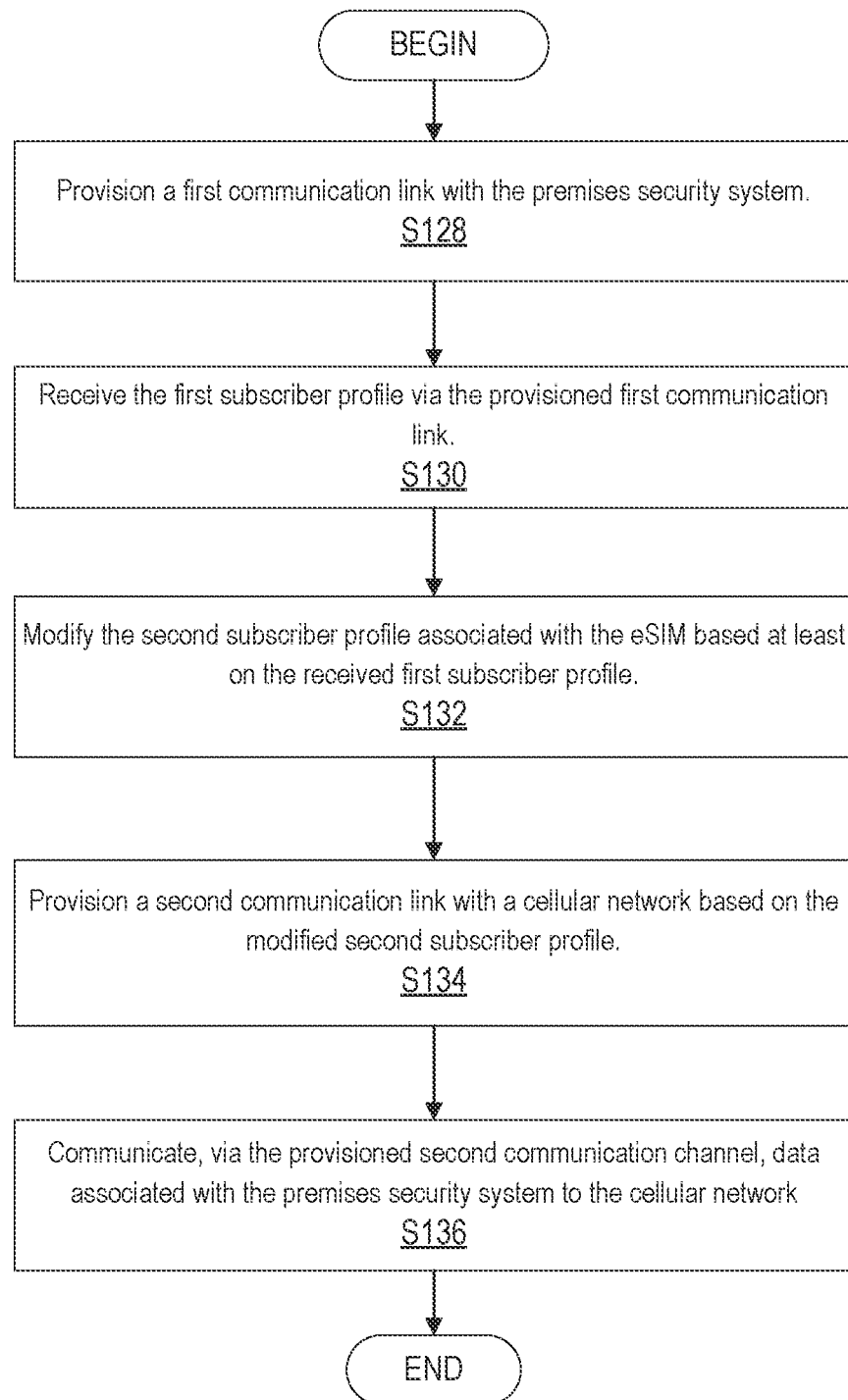
FIG. 7 is a flowchart of an example process in a conversion node according to some embodiments of the present disclosure.

FIG. 7 is a flowchart of an example process (i.e., method) in a conversion node 14 according to some embodiments of the invention. One or more blocks described herein may be performed by one or more elements of conversion node 14 such as by one or more of processing circuitry 38, eSIM 28, conversion unit 26, and/or communication interface 36. Conversion node 14 is configured to provision (Block S128) a first communication link with the premises security system 12, as described herein. Conversion node 14 is configured to receive (Block S130) the first subscriber profile via the provisioned first communication link, as described herein. Conversion node 14 is configured to modify (Block S132) the second subscriber profile associated with the eSIM 28 based at least on the received first subscriber profile, as described herein. Conversion node 14 is configured to provision (Block S134) a second communication link with a cellular network 20 based on the modified second subscriber profile, as described herein. Conversion node 14 is configured to communicate (Block S136), via the second communication link, data associated with the premises security system 12 to the cellular network, as described herein.

According to one or more embodiments, the conversion node 14 is further configured to receive the data over the first communication link using a first radio access technology (RAT), and to cause transmission of the data over the second communication link using a second RAT different than the first RAT.

According to one or more embodiments, the conversion node 14 is further configured wherein the provisioning of the first communication link with the premises security system 12 includes the conversion node 14 broadcasting an indication to the premises security system 12, the indication indicating that the conversion node 14 is a base station supporting the first RAT.

According to one or more embodiments, the processing circuitry 38 of conversion node 14 is configured to cause transmission of the modified second subscriber profile to a security server 16 via the second communication link, and to receive an authentication indication from the security server 16 granting the premises security system 12 access to at least one security function.

According to one or more embodiments, the first RAT is unsupported (e.g., no longer supported) by the cellular network.

According to one or more embodiments, the method further comprises at least one of transmitting and receiving the data over the first communication link using a first radio access technology (RAT); and at least one of transmitting and receiving the data over the second communication link using a second RAT different from the first RAT.

According to one or more embodiments, the method further includes broadcasting data indicating that the conversion node supports the first RAT.

According to one or more embodiments, the method further includes transmitting the modified second subscriber profile to a security server 16 via the second communication link; and receiving from the security server 16 data indicating that the premises security system 12 has been granted access to at least one security function.

According to one or more embodiments, the method further includes modifying the second subscriber profile by including, in the second subscriber profile, first information associated with at least one parameter of the first subscriber profile.

According to one or more embodiments, the method further includes modifying the second subscriber profile by including, in the second subscriber profile, second information associated with the premises security system 12.

According to one or more embodiments, the method further includes provisioning the second communication link with the cellular network using at least one of the first information and the second information associated with the second subscriber profile.

According to one or more embodiments, the method further includes receiving data indicating that the conversion node is authorized to communicate, via the provisioned second communication link, the data associated with the premises security system 12 to the cellular network.

Figure 8:
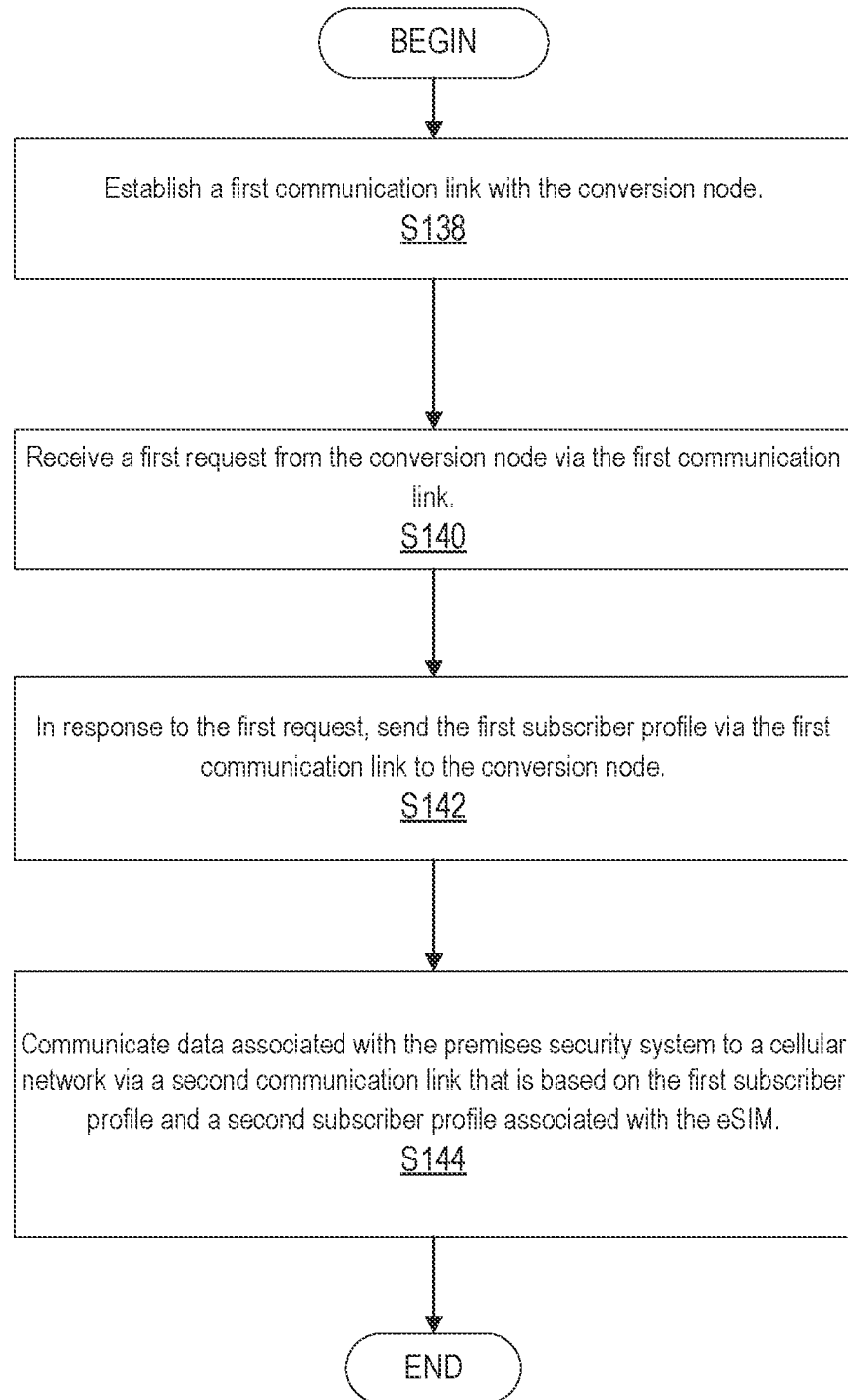
FIG. 8 is a flowchart of an example process in a premises security system according to some embodiments of the present disclosure.

FIG. 8 is a flowchart of an example process in a premises security system 12 according to some embodiments of the invention. One or more blocks described herein may be performed by one or more elements of premises security system 12, such as by one or more premises devices 24 and/or one or more of processing circuitry 50, SIM 25, and/or communication interface 48 of premises devices 24. Premises security system 12 is configured to establish (Block S138) a first communication link with the conversion node 14, as described herein. Premises security system 12 is configured to receive (Block S140) a first request from the conversion node 14 via the first communication link, as described herein. Premises security system 12 is configured to, in response to the first request, send (Block S142) the first subscriber profile via the first communication link to the conversion node, as described herein. Premises security system 12 is configured to communicate (Block S144) data associated with the premises security system 12 to a cellular network 20 via a second communication link that is based on the first subscriber profile associated with the eSIM 28.

According to one or more embodiments, processing circuitry 50 is further configured to cause transmission of a first data packet via the first communication link to the conversion node 14. The first data packet includes a header indicating a destination address of a security server 16. The processing circuitry 50 is further configured to receive a second data packet via the second communication link. The second data packet is associated with the security server 16.

According to one or more embodiments, the first communication link uses a first radio access technology (RAT), and the second communication link uses a second RAT different from the first RAT.

According to one or more embodiments, the premises security system 12 includes a communication interface 48, the communication interface 48 being configured to communicate via the first RAT, and the communication interface 48 lacking a capability to communicate via the second RAT.

Figure 9:
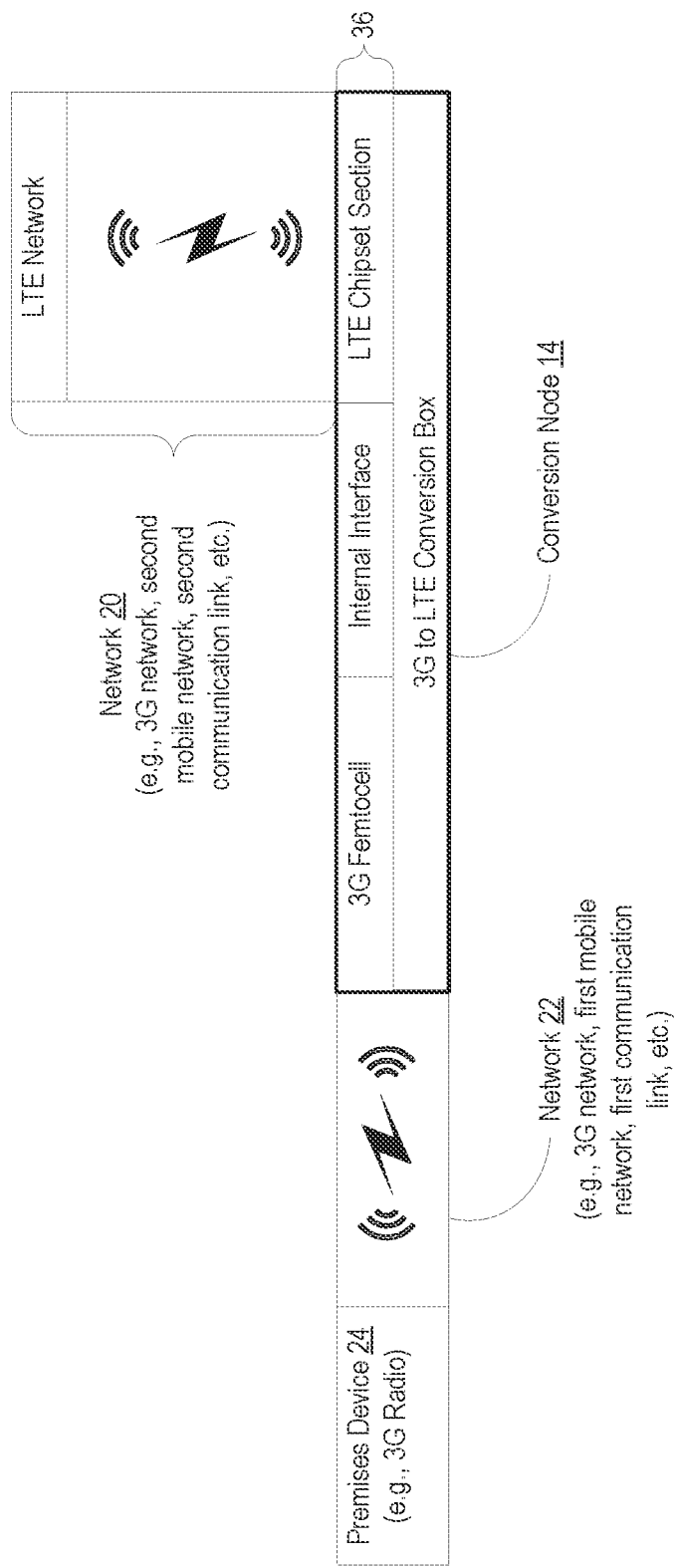
FIG. 9 is an example implementation according to some embodiments of the present disclosure.

FIG. 9 is an example implementation of conversion node 14 where a first RAT (e.g., the legacy RAT) is 3G, and the second RAT (e.g., newer RAT) is LTE (e.g., 4G). In this example, conversion node 14 may be configured to act as conversion box between RATs (e.g., a 3G to LTE conversion box) for communicating with (e.g., receiving or transmitting signaling from or to) the first RAT (e.g., legacy RAT, newer RAT) and converting from a first communication protocol (e.g., supported by and/or compatible with the first RAT) into a second communication protocol (e.g., supported by and/or compatible with the second RAT).

More specifically, in this nonlimiting example, premises device 24 is associated with a premises device account and/or a premises system account and/or configured to communicate using a first RAT such as 3G such as based on the associated premises device account and/or the premises system account. At least some information of the premises device account and/or the premises system account and/or a subscriber profile (e.g., a first subscriber profile) may be stored in SIM 25 of premises device 24, e.g., premises device 24 is provisioned. Conversion node 14 (e.g., the 3G to LTE conversion box) may include communication interface 36, which may be configured to communicate using the first RAT and/or the second RAT and/or any other RAT. In this nonlimiting example, communication interface 36 may include and/or be configured to provide the functions of a femtocell such as a 3G femtocell.

Further, communication interface 36 may include and/or be configured to provide the functions of a chipset section such as an LTE chipset section. The chipset section may refer to an interface configured to support a communication protocol associated with the second RAT (e.g., such as a communication protocol supported by network 20). Communication interface 36 may also include and/or be configured to provide the functions of an internal interface such as between the 3G femtocell and the LTE chipset section and/or be configured to convert signaling between the 3G femtocell and the LTE chipset section. Although the 3G femtocell, internal interface, and the LTE chipset section have been described as comprised by communication interface 36, these are not limited as such and may be comprised in any other component of conversion node 14, e.g., comprised in conversion unit 26 where conversion unit 26 performs at least one function associated with at least one of the 3G femtocell, internal interface, and LTE chipset section.

Conversion node 14 may be configured to modify information of the premises device account and/or the premises system account and/or the subscriber profile (e.g., the first subscriber profile) such as to establish/maintain/terminate communication using at least one of the first and second RATs.

It is understood that the first RAT (e.g., legacy RAT) need not be 3G, and the second RAT (e.g., newer RAT) need not be LTE. For example, it is contemplated that, in some embodiments, 4G could be the first RAT and 5G or 6G could be the second RAT.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings and following claims.

What is claimed is:

1. A conversion node configured to communicate with a premises security system, the premises security system comprising a first memory associated with a first subscriber profile, the conversion node comprising:
 a second memory; and
 processing circuitry in communication with the second memory, the processing circuitry configured to:
  provision a first communication link with the premises security system;
  receive the first subscriber profile via the first communication link;
  provision a second communication link with a cellular network based at least on the first subscriber profile, the first subscriber profile being unsupported by the cellular network for direct communication between the premises security system and the cellular network; and
  communicate, via the second communication link, data associated with the premises security system to the cellular network.

2. The conversion node of claim 1, wherein the processing circuitry is further configured to:
 at least one of cause transmission of and receive the data over the first communication link using a first radio access technology (RAT); and
 at least one of cause transmission of and receive the data over the second communication link using a second RAT different from the first RAT.

3. The conversion node of claim 2, wherein the first RAT is unsupported by the cellular network.

4. The conversion node of claim 2, wherein the processing circuitry is further configured to cause the conversion node to broadcast data to the premises security system indicating that the conversion node supports the first RAT.

5. The conversion node of claim 1, wherein the second memory is associated with a second subscriber profile, and the processing circuitry is further configured to:
- modify the second subscriber profile based at least on the received first subscriber profile;
- cause transmission of the modified second subscriber profile to a security server via the second communication link; and
- receive from the security server data indicating that the premises security system has been granted access to at least one security function.

6. The conversion node of claim 5, wherein the processing circuitry is further configured to modify the second subscriber profile by including, in the second subscriber profile, first information associated with at least one parameter of the first subscriber profile.

7. The conversion node of claim 6, wherein the processing circuitry is further configured to modify the second subscriber profile by including, in the second subscriber profile, second information associated with the premises security system.

8. The conversion node of claim 7, wherein the processing circuitry is further configured to provision the second communication link with the cellular network using at least one of the first information and the second information associated with the second subscriber profile.

9. The conversion node of claim 1, wherein the first memory is a subscriber information module (SIM), and the second memory is an embedded SIM.

10. A method in a conversion node configured to communicate with a premises security system, the premises security system including a first memory associated with a first subscriber profile, the conversion node comprising a second memory, the method comprising:
- provisioning a first communication link with the premises security system;
- receiving the first subscriber profile via the provisioned first communication link;
- provisioning a second communication link with a cellular network based at least on the first subscriber profile, the first subscriber profile being unsupported by the cellular network for direct communication between the premises security system and the cellular network; and
- communicating, via the second communication link, data associated with the premises security system to the cellular network.

11. The method of claim 10, further comprising:
- at least one of transmitting and receiving the data over the first communication link using a first radio access technology (RAT); and
- at least one of transmitting and receiving the data over the second communication link using a second RAT different from the first RAT.

12. The method of claim 11, wherein the first RAT is unsupported by the cellular network.

13. The method of claim 11, further comprising broadcasting data indicating that the conversion node supports the first RAT.

14. The method of claim 10, wherein the second memory is associated with a second subscriber profile, and the method further comprises:
- modifying the second subscriber profile based at least on the received first subscriber profile;
- transmitting the modified second subscriber profile to a security server via the second communication link; and
- receiving from the security server data indicating that the premises security system has been granted access to at least one security function.

15. The method of claim 14, further comprising modifying the second subscriber profile by including, in the second subscriber profile, first information associated with at least one parameter of the first subscriber profile.

16. The method of claim 15, further comprising modifying the second subscriber profile by including, in the second subscriber profile, second information associated with the premises security system.

17. The method of claim 16, further comprising provisioning the second communication link with the cellular network using at least one of the first information and the second information associated with the second subscriber profile.

18. The method of claim 10, wherein the first memory is a subscriber information module (SIM), and the second memory is an embedded SIM.

19. A system, the system comprising:
- a premises security system comprising at least one premises device, the at least one premises device comprising:
  - a first memory associated with a first subscriber profile;
- a conversion node configured to communicate at least with the premise device, the conversion node comprising:
  - a second memory; and
  - processing circuitry in communication with the second memory, the processing circuitry configured to:
    - provision a first communication link with the premises security system
    - receive the first subscriber profile via the provisioned first communication link;
    - provision a second communication link with a cellular network based at least on the first subscriber profile, the first subscriber profile being unsupported by the cellular network for direct communication between the premises security system and the cellular network; and
    - cause transmission, via the second communication link, of the data associated with the premises security system.

20. The system of claim 19, wherein the second memory is associated with a second subscriber profile, and the processing circuitry is further configured to:
- modify the second subscriber profile based at least on the received first subscriber profile;
- receive, via the first communication link, data associated with the premises security system; and
- receive data indicating that the conversion node has been authorized to communicate via the provisioned second communication link;
- cause transmission of the modified second subscriber profile to a security server via the second communication link; and
- receive an authentication indication from the security server granting the premises security system access to at least one security function.

* * * * *